US011817259B2

United States Patent
Kim et al.

(10) Patent No.: US 11,817,259 B2
(45) Date of Patent: *Nov. 14, 2023

(54) MULTI-LAYERED CERAMIC ELECTRONIC COMPONENT

(71) Applicant: SAMSUNG ELECTRO-MECHANICS CO., LTD., Suwon-si (KR)

(72) Inventors: Je Jung Kim, Suwon-si (KR); Dong Yeong Kim, Suwon-si (KR); Woo Chul Shin, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/389,803

(22) Filed: Jul. 30, 2021

(65) Prior Publication Data

US 2021/0358691 A1 Nov. 18, 2021

Related U.S. Application Data

(63) Continuation of application No. 16/289,246, filed on Feb. 28, 2019, now Pat. No. 11,094,466.

(30) Foreign Application Priority Data

Dec. 12, 2018 (KR) .................. 10-2018-0160024

(51) Int. Cl.
*H01G 4/232* (2006.01)
*H01G 4/30* (2006.01)
(Continued)

(52) U.S. Cl.
CPC .......... *H01G 4/2325* (2013.01); *H01G 4/008* (2013.01); *H01G 4/012* (2013.01); *H01G 4/248* (2013.01); *H01G 4/30* (2013.01); *H01G 4/1227* (2013.01)

(58) Field of Classification Search
CPC ...... H01G 4/2325; H01G 4/30; H01G 4/1227; H01G 4/248; H01G 4/008; H01G 4/012
(Continued)

(56) References Cited

U.S. PATENT DOCUMENTS 8,861,180 B2   10/2014   Lee et al.
8,861,181 B2   10/2014   Lee et al.
(Continued)

FOREIGN PATENT DOCUMENTS

CN   103310977 A   9/2013
CN   103310979 A   9/2013
(Continued)

OTHER PUBLICATIONS

Notice of Allowance issued in corresponding U.S. Appl. No. 16/289,246 dated Apr. 13, 2021.
(Continued)

*Primary Examiner* — Arun Ramaswamy
(74) *Attorney, Agent, or Firm* — Morgan, Lewis & Bockius LLP

(57) ABSTRACT

A multi-layered ceramic electronic component has a ceramic body including dielectric layers and a plurality of internal electrodes opposing each other with the dielectric layers interposed therebetween. External electrodes are disposed on an exterior of the ceramic body and are electrically connected to the internal electrodes. Each external electrode includes an electrode layer electrically connected to internal electrodes, and a conductive resin layer arranged on the electrode layer. The conductive resin layer extends to first
(Continued)

and second surface of the ceramic body, and a ratio of a thickness (Tb) of the conductive resin layer extending onto the first surface and the second surface of the ceramic body to a length (Lm) of a length direction margin portion of the ceramic body satisfies 2 to 29%.

14 Claims, 4 Drawing Sheets

(51) Int. Cl.
*H01G 4/248* (2006.01)
*H01G 4/008* (2006.01)
*H01G 4/012* (2006.01)
*H01G 4/12* (2006.01)

(58) Field of Classification Search
USPC ............ 361/321.3, 301.4, 306.3, 303, 321.1
See application file for complete search history.

(56) References Cited

U.S. PATENT DOCUMENTS

| | | | |
|---|---|---|---|
| 9,881,739 | B2 | 1/2018 | Sasabayashi |
| 2011/0007449 | A1 | 1/2011 | Seo et al. |
| 2013/0027839 | A1 | 1/2013 | Kim |
| 2013/0229748 | A1 | 9/2013 | Chung et al. |
| 2013/0242456 | A1 | 9/2013 | Lee et al. |
| 2013/0242457 | A1 | 9/2013 | Lee et al. |
| 2013/0342956 | A1* | 12/2013 | Konishi ............... H01G 4/005 361/301.4 |
| 2014/0153156 | A1 | 6/2014 | Park et al. |
| 2016/0020028 | A1 | 1/2016 | Katsuta |
| 2016/0093438 | A1 | 3/2016 | Sasabayashi |
| 2016/0093442 | A1 | 3/2016 | Nagamoto |
| 2016/0189865 | A1* | 6/2016 | Kawamura ............ H01G 4/012 361/301.4 |
| 2016/0284471 | A1 | 9/2016 | Mizuno et al. |
| 2017/0092424 | A1* | 3/2017 | Morito ................... H01G 4/224 |
| 2017/0098506 | A1* | 4/2017 | Ando ..................... H01G 4/228 |
| 2017/0162329 | A1 | 6/2017 | Ota |
| 2019/0080848 | A1 | 3/2019 | Mizuno et al. |

FOREIGN PATENT DOCUMENTS

| | | | |
|---|---|---|---|
| CN | 106024380 | A | 10/2016 |
| JP | H10-199747 | A | 7/1998 |
| JP | 2011-18874 | A | 1/2011 |
| JP | 2013-030754 | A | 2/2013 |
| JP | 2013-172148 | A | 9/2013 |
| JP | 2014-007187 | A | 1/2014 |
| JP | 2014-110415 | A | 6/2014 |
| JP | 2014-241453 | A | 12/2014 |
| JP | 2015-109411 | A | 6/2016 |
| JP | 2017-028229 | A | 2/2017 |
| JP | 2017-103377 | A | 6/2017 |
| KR | 10-2013-0104339 | A | 9/2013 |
| KR | 10-2013-0104360 | A | 9/2013 |
| KR | 10-2016-0114522 | A | 10/2016 |

OTHER PUBLICATIONS

Final Office Action issued in corresponding U.S. Appl. No. 16/289,246 dated Dec. 22, 2020.
Office Action issued in corresponding U.S. Appl. No. 16/289,246 dated Jun. 23, 2020.
Chinese Office Action dated Jun. 9, 2022, issued in corresponding Chinese Patent Application No. 201910367183.3 (with English translation).
Office Action issued in corresponding Japanese Patent Application No. 2019-031584 dated Jan. 4, 2023, with English translation.
Office Action dated Jun. 9, 2023, in the corresponding Korean Patent Application No. 10-2018-0160024 (See English Translation).

* cited by examiner

MULTI-LAYERED CERAMIC ELECTRONIC COMPONENT

CROSS-REFERENCE TO RELATED APPLICATION

This application is the continuation application of U.S. patent application Ser. No. 16/289,246 filed on Feb. 28, 2019, which claims benefit of priority to Korean Patent Application No. 10-2018-0160024 filed on Dec. 12, 2018 in the Korean Intellectual Property Office, the disclosures of which are incorporated herein by reference in their entirety.

BACKGROUND

1. Field

The present disclosure relates to a multi-layered ceramic electronic component, and more particularly, to a multi-layered ceramic electronic component having excellent reliability.

2. Description of Related Art

In recent years, miniaturization, slimming and multifunctionalization of electronic products have demanded the miniaturization of multi-layered ceramic capacitors, and the mounting of multi-layered ceramic capacitors has also become highly integrated.

A multi-layered ceramic capacitor, a type of electronic component, may be mounted on a printed circuit board of various electronic products, for example, an imaging device such as a liquid crystal display (LCD) or a plasma display panel (PDP), a computer, a personal digital assistant (PDA), a mobile phone, and the like, and may serve to charge or discharge electricity.

Such multi-layered ceramic capacitors may be used as components of various electronic devices, due to having a relatively compact size, a relatively high capacitance, relative ease of mounting, and the like.

In the meantime, as interest in industry for electric/electronic components has increased recently, multi-layered ceramic capacitors are also required to have high reliability and high strength in order to be used in vehicles or infotainment systems.

In particular, since a high bending strength characteristic is desirable for a multi-layered ceramic capacitor, it is advantageous to improve the internal and external structures for improving bending properties.

SUMMARY

An aspect of the present disclosure is to provide a multi-layered ceramic electronic component, and more particularly, to provide a multi-layered ceramic electronic component having excellent reliability.

According to an aspect of the present disclosure, a multi-layered ceramic electronic component has a ceramic body including a dielectric layer, and a plurality of internal electrodes opposing each other with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction. An external electrode is disposed on an exterior of the ceramic body and electrically connected to the internal electrodes. The ceramic body includes an active portion including the plurality of internal electrodes opposing each other with the dielectric layer interposed therebetween, to form capacitance, and cover portions formed above and below the active portion. Each external electrode includes an electrode layer electrically connected to the internal electrode, and a conductive resin layer arranged on the electrode layer, the conductive resin layer extending to the first surface and the second surface of the ceramic body. A ratio of a thickness (Tb) of the conductive resin layer extending to the first surface and the second surface of the ceramic body to a length (Lm) of a length direction margin portion of the ceramic body satisfies 2 to 29%.

According to another aspect of the present disclosure, a multi-layered ceramic electronic component has a ceramic body including a dielectric layer, and a plurality of first and second internal electrodes opposing each other with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction. First and second external electrodes are disposed on an exterior of the ceramic body and electrically connected to the first and second internal electrodes, respectively. The ceramic body includes an active portion including the plurality of first and second internal electrodes opposing each other with the dielectric layer interposed therebetween, to form capacitance, and cover portions formed above and below the active portion. The first and second external electrodes include first and second electrode layers electrically connected to the first and second internal electrodes, respectively, and first and second conductive resin layers arranged on the first and second electrode layers, the first and second conductive resin layers extending to the first surface and the second surface of the ceramic body. A length of a region in which the first and second conductive resin layers extend to the first surface and the second surface of the ceramic body is greater than a length of a region in which the first and second electrode layers extend to the first surface and the second surface of the ceramic body. A ratio of a thickness (Tb) of the first and second conductive resin layers extending to the first surface and the second surface of the ceramic body to a length (Lm) of a length direction margin portion of the ceramic body satisfies 2 to 29%.

According to further aspect of the present disclosure, a multi-layered ceramic electronic component has a body including pluralities of first and second internal electrodes alternately stacked with each other with dielectric layers interposed therebetween, the first and second internal electrodes having first ends extending to first and second opposing surfaces of the body, respectively, and having second ends opposite to the first ends and spaced apart from the second and first opposing surfaces, respectively. First and second external electrodes are disposed on the first and second opposing surfaces of the body, respectively, and extend on to third and fourth surfaces opposing each other in a stacking direction of the internal electrodes. Each of the first and second external electrodes includes an electrode layer extending by a first distance over the third and fourth surfaces, and a conductive resin layer disposed on the electrode layer and extending by a second distance greater than the first distance over the third and fourth surfaces. A ratio of a thickness (Tb) of the conductive resin layer on the third and fourth surfaces, to a length (Lm) by which the second ends of the first and second internal electrodes are spaced apart from the second and first opposing surfaces, respectively, is in the range of 2% to 29%.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
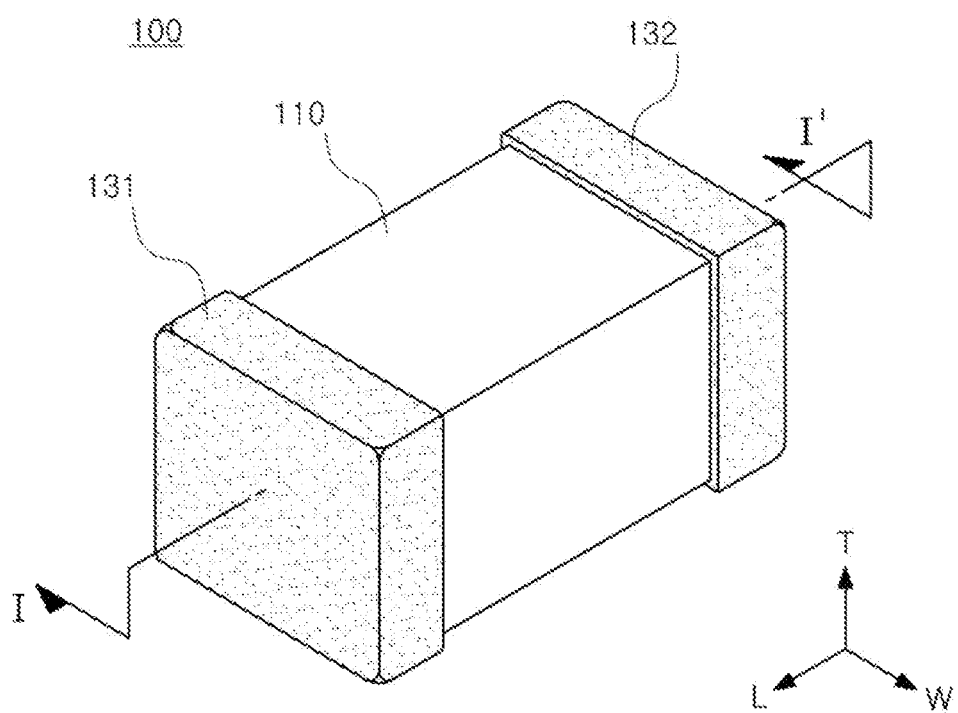
FIG. 1 is a perspective view illustrating a multi-layered ceramic capacitor according to an embodiment of the present disclosure.

The embodiments of the present disclosure may be modified to have various other forms, and the scope of the present disclosure is not limited to the embodiments described below. Embodiments of the present disclosure may be also provided to more fully describe the present disclosure to those skilled in the art. Therefore, the shapes and sizes of the elements in the drawings may be exaggerated for clarity, and the elements denoted by the same reference numerals in the drawings are the same elements.

Throughout the specification, when an element is referred to as "comprising", it means that it may include other elements as well, rather than excluding other elements unless specifically stated otherwise.

In order to clearly illustrate the present disclosure, parts not related to the description are omitted, and thicknesses are enlarged in order to clearly represent layers and regions, and similar portions are denoted by similar reference numerals throughout the specification.

Hereinafter, preferred embodiments of the present disclosure will be described with reference to the accompanying drawings.

FIG. 1 is a perspective view illustrating a multi-layered ceramic capacitor according to an embodiment of the present disclosure.

Figure 2:
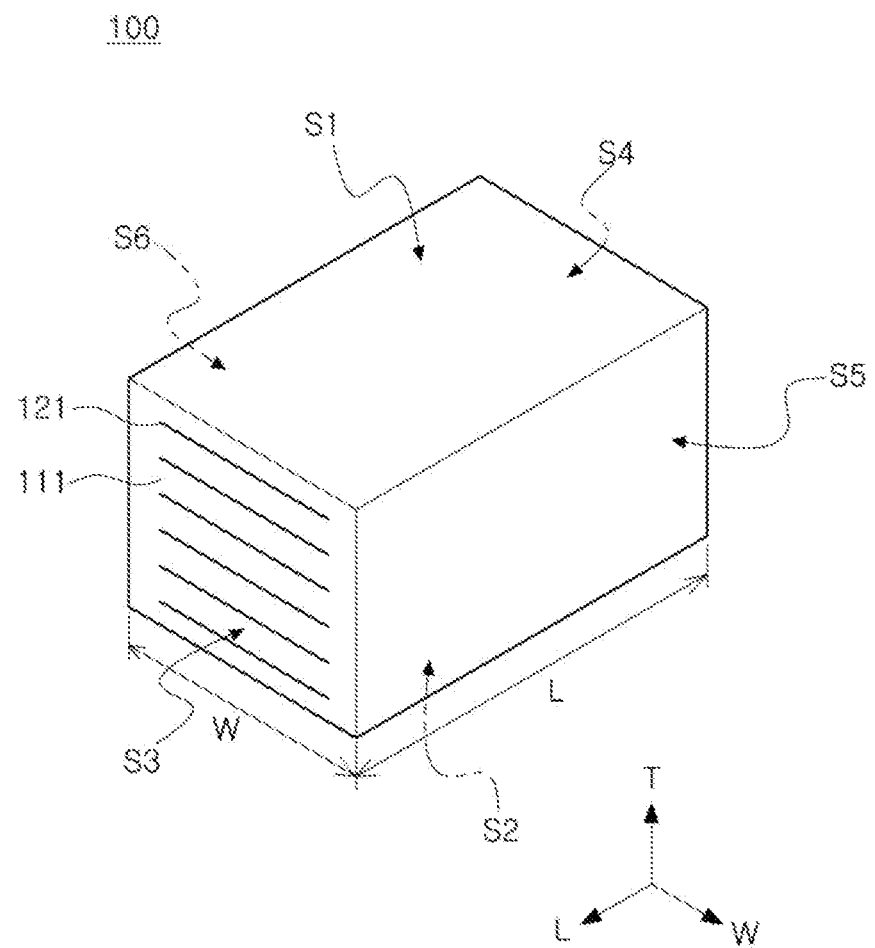
FIG. 2 is a schematic view illustrating a ceramic body according to an embodiment of the present disclosure.

FIG. 2 is a schematic view illustrating a ceramic body according to an embodiment of the present disclosure.

Figure 3:
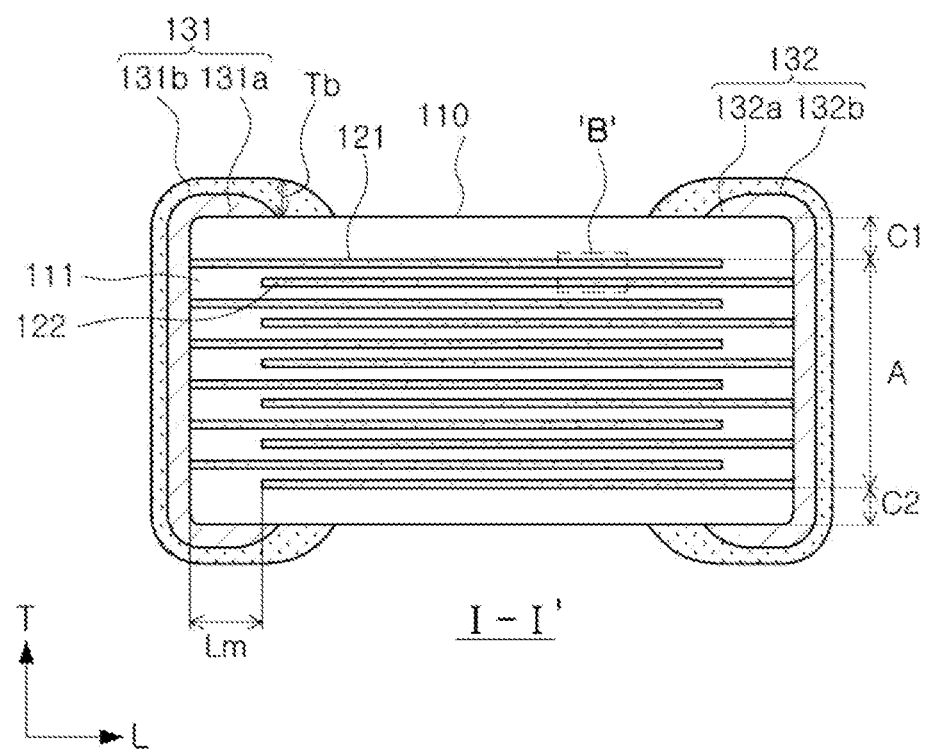
FIG. 3 is a cross-sectional view taken along line I-I' in FIG. 1.

FIG. 3 is a cross-sectional view taken along line I-I' in FIG. 1.

Referring to FIGS. 1 to 3, a multi-layered ceramic electronic device 100 according to an embodiment of the present disclosure may include a ceramic body 110 including a plurality of dielectric layers 111, and a plurality of internal electrodes 121 and 122 opposing each other with the dielectric layers 111 interposed therebetween, and including first and second surfaces S1 and S2 opposing each other in a first direction, third and fourth surfaces S3 and S4 connected to the first and second surfaces S1 and S2 and opposing each other in a second direction, and fifth and sixth surfaces S5 and S6 connected to the first to fourth surfaces S1 to S4 and opposing each other in a third direction. External electrodes 131 or 132 are disposed on an exterior of the ceramic body 110 and electrically connected to the internal electrodes 121 and 122, respectively. The ceramic body 110 includes an active portion A including the plurality of internal electrodes 121 and 122 opposing each other with the dielectric layers 111 interposed therebetween, to form capacitance, and cover portions C1 and C2 formed above and below the active portion A in a stacking direction of the internal electrodes.

Hereinafter, an illustrative multi-layered ceramic electronic component according to an embodiment of the present disclosure will be described, but the present disclosure is not limited thereto.

In a multi-layered ceramic capacitor according to an embodiment of the present disclosure, a 'length direction' of the multi-layered ceramic capacitor refers to an 'L' direction of FIG. 1, a 'width direction' of the multi-layered ceramic capacitor refers to a 'W' direction of FIG. 1, and a 'thickness direction' of the multi-layered ceramic capacitor refers to a 'T' direction of FIG. 1. The 'thickness direction' may be used in the same sense as the direction in which the dielectric layers are stacked up, e.g., as a 'layering direction.'

In an embodiment of the present disclosure, a shape of the ceramic body 110 is not particularly limited in shape, but may be a hexahedral shape, as illustrated.

The ceramic body 110 may include first and second surfaces S1 and S2 opposing each other in a first direction, third and fourth surfaces S3 and S4 connected to the first and second surfaces S1 and S2 and opposing each other in a second direction, and fifth and sixth surfaces S5 and S6 connected to the first to fourth surfaces S1 to S4 and opposing each other in a third direction.

The first surface S1 and the second surface S2 may be defined to face each other in a thickness direction of the ceramic body 110, i.e., in a first direction, the third surface S3 and the fourth surface S4 may be defined to face each other in a length direction of the ceramic body 110, i.e., in a second direction, and the fifth surface S5 and the sixth surface S6 may be defined to face each other in a width direction of the ceramic body 110, i.e., in a third direction.

One end of each of the plurality of internal electrodes 121 and 122 formed in the ceramic body 110 may be exposed to the third surface S3 or the fourth surface S4 of the ceramic body.

The internal electrodes 121 and 122 may have a first internal electrode 121 and a second internal electrode 122, having different polarities, disposed in pairs in the body 110.

One end of the first internal electrode 121 may be exposed to the third surface S3, and one end of the second internal electrode 122 may be exposed to the fourth surface S4.

The other ends of the first internal electrode 121 and the second internal electrode 122 may be formed at or spaced apart by regular intervals from the fourth surface S4 or the third surface S3. More specific details thereof will be described later.

The first and second external electrodes 131 and 132 may be formed on the third surface S3 and the fourth surface S4 of the ceramic body, and may be electrically connected to the internal electrodes 121 and 122, respectively.

According to an embodiment of the present disclosure, a raw material for forming the dielectric layer 111 is not particularly limited as long as sufficient electrostatic capacitance may be obtained. For example, a barium titanate-based material, a complex lead perovskite-based material, a strontium titanate-based material, or the like may be used.

Various ceramic additives, organic solvents, plasticizers, binders, dispersants, and the like, may be added including barium titanate ($BaTiO_3$) powder, or the like, materials for forming the dielectric layer 111, in accordance with the purpose of the present disclosure.

The ceramic body 110 may include an active portion A serving as a portion contributing to capacitance formation of the capacitor, and an upper cover portion C1 and a lower cover portion C2 formed respectively above and below (in a stacking direction) the active portion A as upper and lower margin portions.

The active portion A may be formed by repeatedly stacking the plurality of first and second inner electrodes 121 and 122 with the dielectric layers 111 interposed therebetween.

The upper cover portion C1 and the lower cover portion C2 may have the same material and configuration as those of the dielectric layer 111, except that they do not include internal electrodes.

For example, the upper cover portion C1 and the lower cover portion C2 may include a ceramic material, for example, a barium titanate ($BaTiO_3$)-based ceramic material.

The upper cover portion C1 and the lower cover portion C2 may be formed by stacking a single dielectric layer or two or more dielectric layers on upper and lower surfaces of the active portion A in the vertical direction, and may basically serve to prevent the internal electrode from being damaged by physical or chemical stress.

The material forming the first and second internal electrodes 121 and 122 is not particularly limited, and may be formed using a conductive paste including one or more of silver (Ag), lead (Pb), platinum (Pt), nickel (Ni), and copper (Cu).

A multi-layered ceramic capacitor according to an embodiment of the present disclosure may include a first external electrode 131 electrically connected to the first internal electrode(s) 121 and a second external electrode 132 electrically connected to the second internal electrode(s) 122.

The first and second external electrodes 131 and 132 may be electrically connected to the first and second internal electrodes 121 and 122 to form electrostatic capacitance, and the second external electrode 132 may be connected to a potential different from that of the first external electrode 131.

The first and second external electrodes 131 and 132 may be respectively arranged on the third surface S3 and the fourth surface S4 in the length direction, i.e., in the second direction of the ceramic body 110, but may extend into the first surface S1 and the second surface S2 in the thickness direction, i.e., in the first direction of the ceramic body 110.

The external electrodes 131 and 132 may be disposed on an exterior of the ceramic body 110, and may include electrode layers 131a and 132a electrically connected to and in direct contact with the internal electrodes 121 and 122, and conductive resin layers 131b and 132b arranged on the electrode layers 131a and 132a.

In particular, the first external electrode 131 may be disposed on the third surface S3 in the length direction, i.e., in the second direction of the ceramic body 110, and may include a first electrode layer 131a disposed directly on the third surface S3 to be electrically connected to the first internal electrode(s) 121, and a first conductive resin layer 131b disposed on the first electrode layer 131a.

Further, the second external electrode 132 may be disposed on the fourth surface S4 in the length direction, i.e., in the second direction of the ceramic body 110, and electrically connected to the second internal electrode(s) 122, and may include a second electrode layer 132a disposed directly on the fourth surface S4 to be electrically connected to the second internal electrode(s) 122, and a second conductive resin layer 132b disposed on the second electrode layer 132a.

The electrode layers 131a and 132a may include a conductive metal and a glass.

The conductive metal used for the electrode layers 131a and 132a is not particularly limited as long as it is a material that may be electrically connected to the internal electrode for formation of electrostatic capacitance. For example, the conductive metal may be one or more selected from the group consisting of copper (Cu), silver (Ag), nickel (Ni), and alloys thereof.

The electrode layers 131a and 132a may be formed by applying a conductive paste prepared by adding glass frit to a powder of the conductive metal, and then firing the paste.

The conductive resin layers 131b and 132b may be formed on the electrode layers 131a and 132a, and may be formed to completely cover the electrode layers 131a and 132a.

A base resin included in the conductive resin layers 131b and 132b is not particularly limited as long as it has bondability and impact absorbing ability, and may be mixed with the conductive metal powder to form a paste. For example, the base resin may include an epoxy resin.

The conductive metal included in the conductive resin layers 131b and 132b is not particularly limited as long as it is a material that may be electrically connected to the electrode layers 131a and 132a. For example, the conductive metal may include one or more selected from the group consisting of copper (Cu), silver (Ag), nickel (Ni), and alloys thereof.

The conductive resin layers 131b and 132b may overhang an edge of the electrode layers 131a and 132a so as to extend to the first surface S1 and the second surface S2 of the ceramic body 110. A ratio of the thickness (Tb) of the conductive resin layers 131b and 132b extending onto the first surface S1 and the second surface S2 of the ceramic body 110 to a length (Lm) of a length direction margin portion (a length direction portion in which only the first internal electrodes 121 overlap each other, or a length direction portion in which only the second internal electrodes 122 overlap each other) of the ceramic body 110 may satisfy 2 to 29%.

According to an embodiment of the present disclosure, the conductive resin layers 131b and 132b may overhang an edge of the electrode layers 131a and 132a so as to extend to the first surface S1 and the second surface S2 of the ceramic body 110. A ratio of the thickness (Tb) of the conductive resin layers 131b and 132b extending onto the first surface S1 and the second surface S2 of the ceramic body 110 to a length (Lm) of a length direction margin portion of the ceramic body 110 may satisfy 2 to 29%. Therefore, bending strength of the multi-layered ceramic capacitor may be improved.

The thickness (Tb) of the conductive resin layers 131b and 132b extending to the first surface S1 and the second surface S2 of the ceramic body 110 may be a maximum thickness among thicknesses of the conductive resin layers 131b and 132b.

Meanwhile, the length (Lm) of the length direction margin portions of the ceramic body 110 may be a length extending from one of the third surface S3 and the fourth surface S4 of the ceramic body 110 to an end portion (e.g., a proximate end) of a region in which the plurality of internal electrodes 121 and 122 disposed in the active portion A overlap with each other.

Generally, in evaluating bending strength characteristics of the multi-layered ceramic capacitor, the number of stacked dielectric layers on which the internal electrodes are printed, and the degree of application of the conductive resin layer, which is a secondary electrode in the external electrodes, may be important factors for ensuring the bending strength.

In particular, as the number of stacked layers increases, a fraction of the internal electrode may be relatively high to increase the bending strength. Meanwhile, when a fraction of the internal electrode is relatively low, the bending structure may be deteriorated.

Meanwhile, when the fraction of the internal electrode affects the improvement of the strength of the multi-layered ceramic capacitor, the conductive resin layer, which is the secondary electrode of the external electrodes, may be applied as an apparatus for absorbing or solving the stress by the external action. Therefore, there has recently been a trial to achieve a certain level of bending strength by increasing an amount of the application.

In an embodiment of the present disclosure, a ratio of a thickness (Tb) of the conductive resin layers 131b and 132b extending to the first surface S1 and the second surface S2 of the ceramic body 110 and a length (Lm) of the length direction margin portion, which is a region in which a fraction of (or a number of) the internal electrode in the ceramic body 110 is relatively low, may be controlled. Therefore, bending strength of the multi-layered ceramic capacitor may be improved.

For example, a ratio of the thickness (Tb) of the conductive resin layers 131b and 132b extending to the first surface S1 and the second surface S2 of the ceramic body 110 to a length (Lm) of a length direction margin portion of the ceramic body 110 may be controlled to satisfy 2 to 29%. Therefore, bending strength of the multi-layered ceramic capacitor may be improved.

When a ratio of the thickness (Tb) of the conductive resin layers 131b and 132b extending to the first surface S1 and the second surface S2 of the ceramic body 110 to a length (Lm) of the length direction margin portion of the ceramic body 110 is less than 2%, defects may occur in measuring bending strength at 5 mm, and no effect enhancing bending strength may be exerted.

When a ratio of the thickness (Tb) of the conductive resin layers 131b and 132b extending to the first surface S1 and the second surface S2 of the ceramic body 110 to a length (Lm) of a length direction margin portion of the ceramic body 110 exceeds 29%, the external electrode may have a relatively high thickness. Therefore, reliability may be lowered due to poor appearance of the finished product, occurrence of voids in the conductive resin layer, and the like.

Figure 4:
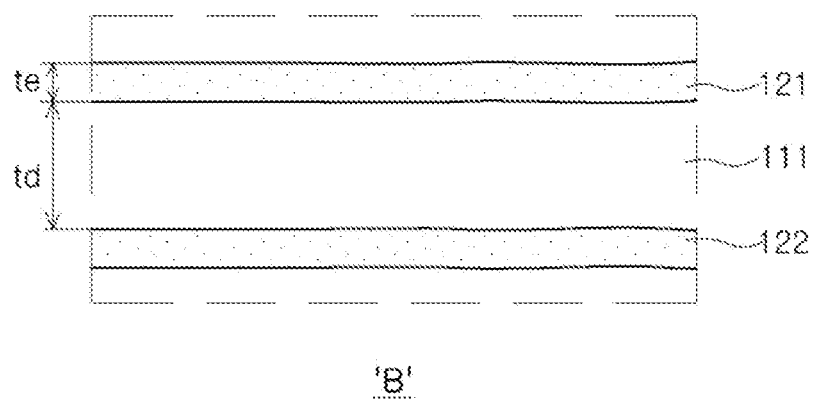
FIG. 4 is an enlarged view of portion B in FIG. 3.

FIG. 4 is an enlarged view of portion B in FIG. 3.

Referring to FIG. 4, in a multi-layered ceramic electronic component according to an embodiment of the present disclosure, a thickness (td) of the dielectric layer 111 (e.g., a distance between two adjacent internal electrodes 121 and 122) and a thickness (te) of the internal electrodes 121 and 122 (e.g., a distance between two adjacent dielectric layers 111 having an internal electrode therebetween) may satisfy the relationship td>2×te.

For example, according to an embodiment of the present disclosure, the thickness (td) of the dielectric layer 111 may be larger than twice the thickness (te) of the internal electrodes 121 and 122.

Generally, electronic components in a high voltage electric/electronic device may have a reliability problem due to a decrease in dielectric breakdown voltage under a relatively high voltage environment.

The multi-layered ceramic capacitor according to an embodiment of the present disclosure may improve dielectric breakdown voltage characteristics by increasing the thickness (td) of the dielectric layer 111 to be larger than twice the thickness (te) of the internal electrodes 121 and 122 to prevent a decrease in dielectric breakdown voltage under a relatively high voltage environment, and by increasing a thickness of the dielectric layer which is a distance between the internal electrodes.

When the thickness (td) of the dielectric layer 111 is twice or less than the thickness (te) of the internal electrodes 121 and 122, the dielectric breakdown voltage may decrease due to a relatively thin dielectric layer, which is a distance between the internal electrodes.

The thickness (te) of the internal electrode may be less than 1 µm, and the thickness (td) of the dielectric layer may be less than 2.8 µm, but is not necessarily limited thereto.

The multi-layered ceramic electronic component 100 according to another embodiment of the present disclosure may include a ceramic body 110 including dielectric layers 111, and pluralities of first and second internal electrodes 121 and 122 opposing each other with the dielectric layers 111 interposed therebetween, and including first and second surfaces S1 and S2 opposing each other in a first direction, third and fourth surfaces S3 and S4 connected to the first and second surfaces S1 and S2 and opposing each other in a second direction, and fifth and sixth surfaces S5 and S6 connected to the first to fourth surfaces S1 to S4 and opposing each other in a third direction; and first and second external electrodes 131 and 132 disposed on an exterior of the ceramic body 110 and electrically connected to the first and second internal electrodes 121 and 122, respectively. The ceramic body 110 includes an active portion A including the pluralities of first and second internal electrodes 121 and 122 opposing each other with the dielectric layers 111 interposed therebetween, to form capacitance, and cover portions C1 and C2 formed above and below the active portion A. The first and second external electrodes 131 and 132 include first and second electrode layers 131a and 132a electrically connected to and contacting the first and second internal electrodes 121 and 122, respectively, and first and second conductive resin layers 131b and 132b arranged on the first and second electrode layers 131a and 132a. The first and second conductive resin layers 131b and 132b extend to the first surface S1 and the second surface S2 of the ceramic body 110, and a length of a region in which the first and second conductive resin layers 131b and 132b extend to (and over) the first surface S1 and the second surface S2 of the ceramic body 110 is greater than a length of a region in which the first and second electrode layers 131a and 132a extend onto the first surface S1 and the second surface S2 of the ceramic body 110, and a ratio of a thickness (Tb) of the first and second conductive resin layers 131b and 132b extending onto the first surface S1 and the second surface S2 of the ceramic body 110 to a length (Lm) of a length direction margin portion of the ceramic body 110 satisfies 2 to 29%.

In the description of the multi-layered ceramic electronic component according to another embodiment of the present disclosure, the same parts as those of the multi-layered ceramic electronic component according to the embodiment of the present disclosure described above may be omitted here to avoid redundant explanations.

According to another embodiment of the present disclosure, a length of a region in which the first and second conductive resin layers 131b and 132b extend to the first surface S1 and the second surface S2 of the ceramic body 110 (e.g., a length from the third surface S3 to the furthest point of the first conductive resin layer 131b on the first and second surfaces S1 and S2 along the length direction, or a length from the fourth surface S4 to the furthest point of the second conductive resin layer 132b on the first and second surfaces S1 and S2 along the length direction) may be greater than a length of a region in which the first and second electrode layers 131a and 132a extend to the first surface S1 and the second surface S2 of the ceramic body 110 (e.g., a length from the third surface S3 to the furthest point of the first electrode layer 131a on the first and second surfaces S1 and S2 along the length direction, or a length from the fourth surface S4 to the furthest point of the second electrode layer 132a on the first and second surfaces S1 and S2 along the length direction).

For example, the first and second conductive resin layers 131b and 132b may be formed on the first and second electrode layers 131a and 132a, respectively, and may be formed to completely cover the first and second electrode layers 131a and 132a by extending over ends of the first and second electrode layers 131a and 132a to come into contact with the first and second surfaces S1 and S2.

Therefore, a length of a region in which the first and second conductive resin layers 131b and 132b extend to the first surface S1 and the second surface S2 of the ceramic body 110 may be disposed to be greater than a length of a region in which the first and second electrode layers 131a and 132a extend to the first surface S1 and the second surface S2 of the ceramic body 110.

The first and second external electrodes 131 and 132 may be disposed on an exterior of the ceramic body 110, and may include first and second electrode layers 131a and 132a electrically connected to the first and second internal electrodes 121 and 122, respectively, and first and second conductive resin layers 131b and 132b disposed on the first and second electrode layers 131a and 132a, respectively.

In particular, the first external electrode 131 may be disposed on the third surface S3 in the length direction, i.e., in the second direction of the ceramic body 110, and may include a first electrode layer 131a electrically connected to (and physically contacting) the first internal electrode 121, and a first conductive resin layer 131b disposed on the first electrode layer 131a.

Further, the second external electrode 132 may be disposed on the fourth surface S4 in the length direction, i.e., in the second direction of the ceramic body 110 and electrically connected to the second internal electrode 122, and may include a second electrode layer 132a electrically connected to (and physically contacting) the second internal electrode 122, and a second conductive resin layer 132b disposed on the second electrode layer 132a.

Hereinafter, a method of manufacturing a multi-layered ceramic electronic component according to an embodiment of the present disclosure will be described, but the present disclosure is not limited thereto.

A method of manufacturing a multi-layered ceramic electronic device according to an embodiment of the present disclosure may include firstly applying a slurry formed of a powder such as barium titanate ($BaTiO_3$) or the like to a carrier film and drying the same to form a plurality of ceramic green sheets, to form a dielectric layer.

The ceramic green sheet may be prepared by mixing a ceramic powder, a binder, and a solvent to prepare a slurry, and by subjecting the slurry to a doctor blade method to form a sheet having a thickness of several micrometers.

Next, an internal electrode conductive paste having an average nickel particle size of 0.1 to 0.2 μm and containing nickel powder of 40 to 50 parts by weight may be provided.

The internal electrode conductive paste may be applied on the green sheet by a screen printing method to form internal electrodes, and then green sheets on which internal electrode patterns are arranged may be stacked to form a ceramic body 110.

Next, an electrode layer including one or more conductive metal selected from the group consisting of copper (Cu), silver (Ag), nickel (Ni), and alloys thereof, and glass may be formed on an exterior of the ceramic body.

The glass is not particularly limited, and a material having the same composition as glass used for manufacturing an external electrode of a conventional multi-layered ceramic capacitor may be used.

The electrode layer may be formed on the upper and lower surfaces and the end portions of the ceramic body to be electrically connected to the first and second internal electrodes, respectively.

The electrode layer may contain 5% by volume or more of glass, based on the conductive metal.

Next, a conductive resin composition may be applied on the electrode layers 131a and 132a, and then cured, to form the conductive resin layers 131b and 132b.

The conductive resin layers 131b and 132b may include one or more conductive metal selected from the group consisting of copper (Cu), silver (Ag), nickel (Ni), and alloys thereof, and a base resin, and the base resin may be an epoxy resin.

According to an embodiment of the present disclosure, the conductive resin layer may be disposed to extend to the first surface and the second surface of the ceramic body, and a ratio of a thickness (Tb) of the first and second conductive resin layers 131b and 132b extending to the first surface S1 and the second surface S2 of the ceramic body 110 to a length (Lm) of a length direction margin portion of the ceramic body 110 may satisfy 2 to 29%.

The thickness (Tb) of the first and second conductive resin layers 131b and 132b extending to the first surface S1 and the second surface S2 of the ceramic body 110 may be a maximum thickness among thicknesses of the conductive resin layers 131b and 132b, and may be measured substantially orthogonally to the first surface S1 and the second surface S2 of the ceramic body 110.

Meanwhile, the length (Lm) of the length direction margin portions of the ceramic body 110 may be a length covering from the third surface S3 and the fourth surface S4 of the ceramic body 110 to an end portion of a region in which the plurality of internal electrodes 121 and 122 disposed in the active portion A overlap, and may be measured in a length direction substantially orthogonal to the third and fourth surfaces.

Hereinafter, the occurrence frequency of bending cracks was measured in accordance with a ratio of a thickness (Tb) of the first and second conductive resin layers 131b and 132b extending to the first surface S1 and the second surface S2 of the ceramic body 110 to a length (Lm) of a length direction margin portion of the ceramic body 110, and values thereof were reported in Table 1.

In the case of measuring the frequency of bending cracks, samples of multi-layered ceramic capacitor were mounted on a substrate. A distance from a central portion pressed by the bending was set to be 5 mm, and each of the 60 samples was measured five times and was observed to determine whether or not bending strength at 5 mm was guaranteed.

TABLE 1

| Sample | Tb/Lm | A | B | C | D | E |
| --- | --- | --- | --- | --- | --- | --- |
| *1 | 1.0% | 3/60 | 1/60 | 1/60 | 2/60 | 1/60 |
| 2 | 2.0% | 0/60 | 0/60 | 0/60 | 0/60 | 0/60 |

TABLE 1-continued

| Sample | Tb/Lm | A | B | C | D | E |
|---|---|---|---|---|---|---|
| 3 | 10.0% | 0/60 | 0/60 | 0/60 | 0/60 | 0/60 |
| 4 | 15.0% | 0/60 | 0/60 | 0/60 | 0/60 | 0/60 |
| 5 | 29.0% | 0/60 | 0/60 | 0/60 | 0/60 | 0/60 |
| *6 | 30.0% | 0/60 | 0/60 | 0/60 | 0/60 | 0/60 |

*Comparative Example

Referring to Table 1, it can be seen that, in the cases of Samples 2 to 5 in which a ratio of a thickness (Tb) of the first and second conductive resin layers 131b and 132b extending to the first surface S1 and the second surface S2 of the ceramic body 110 to a length (Lm) of a length direction margin portion of the ceramic body 110 satisfies 2 to 29%, according to an embodiment of the present disclosure, bending strength at distances up to 5 mm may be satisfied.

In contrast, it can be seen that, in the case of Comparative Example 1 in which a ratio of a thickness (Tb) of the first and second conductive resin layers 131b and 132b extending to the first surface S1 and the second surface S2 of the ceramic body 110 to a length (Lm) of a length direction margin portion of the ceramic body 110 is less than 2%, defects may occur in measuring bending strength at 5 mm, and no effect enhancing bending strength may be exerted.

In the case of Comparative Example 6 in which a ratio of a thickness (Tb) of the first and second conductive resin layers 131b and 132b extending to the first surface S1 and the second surface S2 of the ceramic body 110 to a length (Lm) of a length direction margin portion of the ceramic body 110 exceeds 29%, bending strength characteristics may be satisfied, but the thickness of the external electrode may be relatively high. Therefore, reliability may be lowered due to poor appearance of the finished product, occurrence of voids in the conductive resin layer, and the like.

According to an embodiment of the present disclosure, the thickness (Tb) of the first and second conductive resin layers extending to the first surface and the second surface of the ceramic body to the length (Lm) of the length direction margin portion of the ceramic body may be controlled. Therefore, bending strength may be improved and the reliability may be improved.

While exemplary embodiments have been shown and described above, it will be apparent to those skilled in the art that modifications and variations could be made without departing from the scope of the present disclosure as defined by the appended claims.

What is claimed is:

1. A multi-layered ceramic electronic component comprising:
a ceramic body including a plurality of dielectric layers, and a plurality of internal electrodes opposing each other with the dielectric layers interposed therebetween, and including first and second surfaces opposing each other in a first direction corresponding to a stacking direction of the internal electrodes, third and fourth surfaces connected to the first and second surfaces and opposing each other in a second direction, and fifth and sixth surfaces connected to the first to fourth surfaces and opposing each other in a third direction; and
external electrodes disposed on the third and fourth surfaces on an exterior of the ceramic body and electrically connected to the internal electrodes,
wherein the ceramic body includes an active portion including the plurality of internal electrodes opposing each other with the dielectric layers interposed therebetween, to form capacitance, and cover portions formed above and below the active portion and free of the internal electrodes,
each external electrode includes an electrode layer disposed on the third and fourth surfaces to be electrically connected to at least some of the internal electrodes, and a conductive resin layer arranged on the electrode layer, the conductive resin layer extending to the first surface and the second surface of the ceramic body,
a ratio of a thickness (Tb) of the conductive resin layer extending to the first surface and the second surface of the ceramic body to a length (Lm) of a length direction margin portion of the ceramic body satisfies 2 to 29%,
a thickness (td) of the dielectric layers and a thickness (te) of the internal electrodes satisfy the relationship td>2× te, and
the thickness (Tb) of the conductive resin layer extending to the first surface and the second surface of the ceramic body is a maximum thickness among thicknesses of the conductive resin layer measured orthogonally to the first surface.

2. The multi-layered ceramic electronic component according to claim 1, wherein the length (Lm) of the length direction margin portion of the ceramic body is a length, measured along the second direction, extending from the third surface or the fourth surface of the ceramic body to an end portion of a region in which the plurality of internal electrodes disposed in the active portion overlap.

3. The multi-layered ceramic electronic component according to claim 1, wherein the electrode layer comprises one or more conductive metal selected from the group consisting of copper (Cu), silver (Ag), nickel (Ni), and alloys thereof.

4. The multi-layered ceramic electronic component according to claim 1, wherein the conductive resin layer comprises one or more conductive metal selected from the group consisting of copper (Cu), silver (Ag), nickel (Ni), and alloys thereof, and a base resin.

5. The multi-layered ceramic electronic component according to claim 1, wherein the thickness (te) of the internal electrodes is less than 1 μm.

6. The multi-layered ceramic electronic component according to claim 1, wherein the thickness (td) of the dielectric layers is less than 2.8 μm.

7. A multi-layered ceramic electronic component comprising:
a ceramic body including a plurality of dielectric layers, and pluralities of first and second internal electrodes opposing each other with the dielectric layers interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and
first and second external electrodes disposed on an exterior of the ceramic body and electrically connected to the first and second internal electrodes, respectively,
wherein the ceramic body includes an active portion including the plurality of first and second internal electrodes opposing each other with the dielectric layers interposed therebetween, to form capacitance, and cover portions formed above and below the active portion in the first direction,
the first and second external electrodes include first and second electrode layers electrically connected to the first and second internal electrodes, respectively, and first and second conductive resin layers arranged on the first and second electrode layers, the first and second conductive resin layers extending to the first surface and the second surface of the ceramic body, a length of a region in which the first and second conductive resin layers extend over the first surface and the second surface of the ceramic body is greater than a length of a region in which the first and second electrode layers extend over the first surface and the second surface of the ceramic body, a ratio of a thickness (Tb) of the first and second conductive resin layers extending to the first surface and the second surface of the ceramic body to a length (Lm) of a length direction margin portion of the ceramic body satisfies 2 to 29%, a thickness (td) of the dielectric layers and a thickness (te) of the internal electrodes satisfy the relationship td>2× te, and the thickness (Tb) of the conductive resin layers extending to the first surface and the second surface of the ceramic body is a maximum thickness among thicknesses of the conductive resin layers measured orthogonally to the first surface.

8. The multi-layered ceramic electronic component according to claim 7, wherein the length (Lm) of the length direction margin portion of the ceramic body is a length, measured in the second direction along which the third and fourth surfaces are opposed, extending from the third surface or the fourth surface of the ceramic body to an end portion of a region in which the first and second internal electrodes disposed in the active portion overlap.

9. The multi-layered ceramic electronic component according to claim 7, wherein each of the first and second electrode layers comprises one or more conductive metal selected from the group consisting of copper (Cu), silver (Ag), nickel (Ni), and alloys thereof.

10. The multi-layered ceramic electronic component according to claim 7, wherein each of the first and second conductive resin layers comprises one or more conductive metal selected from the group consisting of copper (Cu), silver (Ag), nickel (Ni), and alloys thereof, and a base resin.

11. The multi-layered ceramic electronic component according to claim 7, wherein the thickness (te) of the internal electrodes is less than 1 μm.

12. The multi-layered ceramic electronic component according to claim 7, wherein the thickness (td) of the dielectric layers is less than 2.8 μm.

13. A multi-layered ceramic electronic component comprising:
a body including pluralities of first and second internal electrodes alternately stacked with each other with dielectric layers interposed therebetween, the first and second internal electrodes having first ends extending to first and second opposing surfaces of the body, respectively, and having second ends opposite to the first ends and spaced apart from the second and first opposing surfaces, respectively; and first and second external electrodes disposed on the first and second opposing surfaces of the body, respectively, and extending on to third and fourth surfaces opposing each other in a stacking direction of the internal electrodes, wherein each of the first and second external electrodes includes an electrode layer extending by a first distance over the third and fourth surfaces, and a conductive resin layer disposed on the electrode layer and extending by a second distance greater than the first distance over the third and fourth surfaces, a ratio of a thickness (Tb) of the conductive resin layer on the third and fourth surfaces, to a length (Lm) by which the second ends of the first and second internal electrodes are spaced apart from the second and first opposing surfaces, respectively, is in the range of 2% to 29%, a thickness (td) of the dielectric layers and a thickness (te) of the internal electrodes satisfy the relationship td>2× te, and the thickness (Tb) of the conductive resin layer is a maximum thickness of the conductive resin layer measured orthogonally to the third surface.

14. The multi-layered ceramic electronic component according to claim 13, wherein the thickness (te) of the internal electrodes is less than 1 μm, and the thickness (td) of the dielectric layers is less than 2.8 μm.

* * * * *